March 28, 1950     D. SILVERMAN     2,501,790
PHOTOELECTRIC SPARK RECORDER

Filed April 27, 1944     2 Sheets-Sheet 1

Inventor:
Daniel Silverman
By: Paul F. Hawley
Patent Agent

March 28, 1950 — D. SILVERMAN — 2,501,790
PHOTOELECTRIC SPARK RECORDER
Filed April 27, 1944 — 2 Sheets-Sheet 2
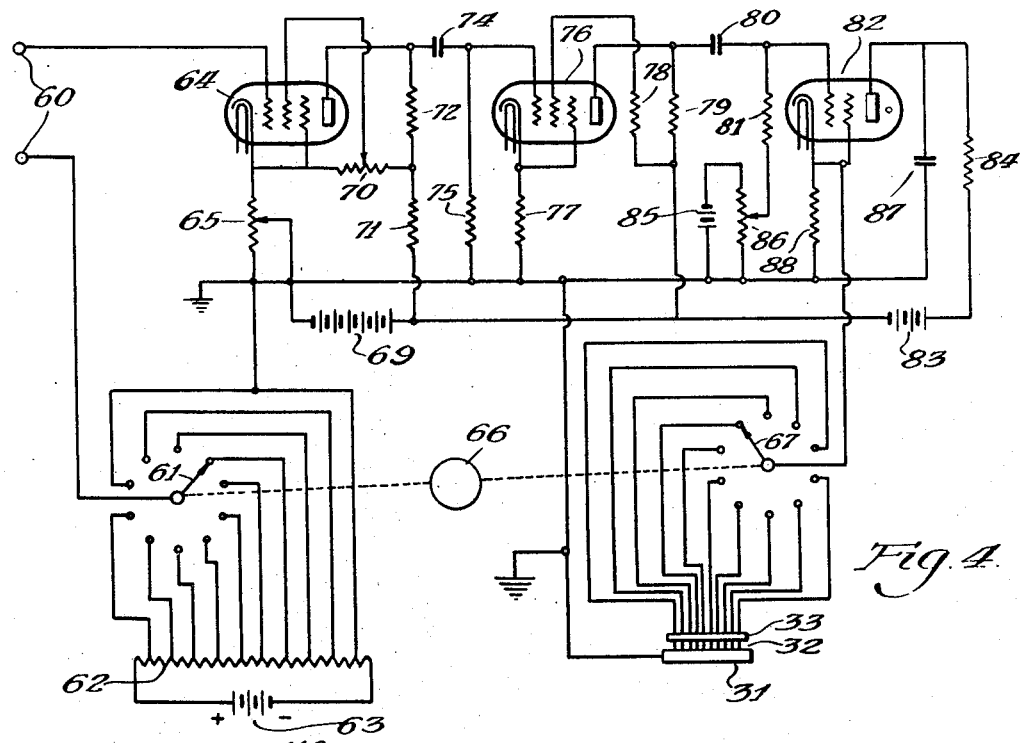
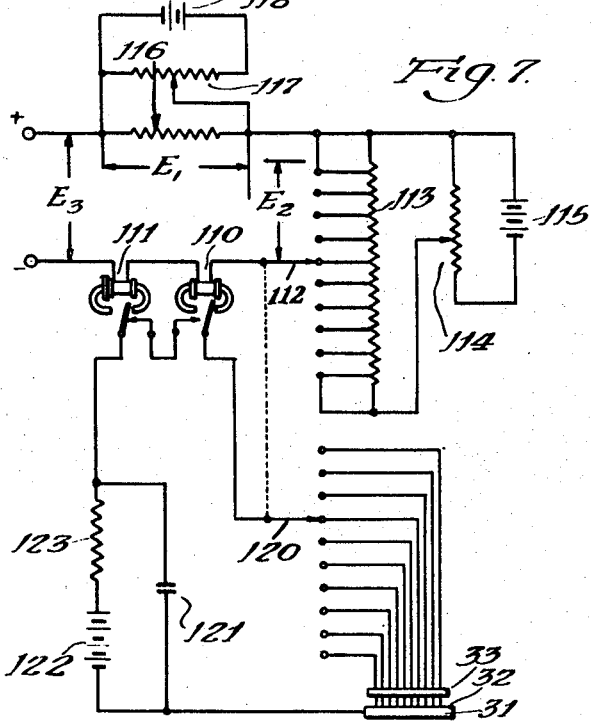
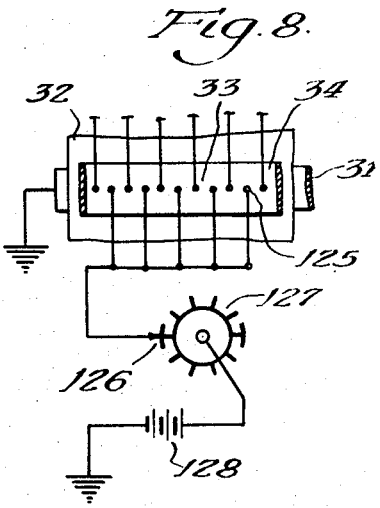
Inventor:
Daniel Silverman
By: Paul F Hawley
Patent Agent Patented Mar. 28, 1950

2,501,790

UNITED STATES PATENT OFFICE 2,501,790

PHOTOELECTRIC SPARK RECORDER

Daniel Silverman, Tulsa, Okla., assignor to Stanolind Oil and Gas Company, Tulsa, Okla., a corporation of Delaware Application April 27, 1944, Serial No. 533,085

10 Claims. (Cl. 346—33)

This application pertains to the art of electric recording and is particularly applicable to the recording of electric variations on a moving strip of paper by means of which a permanent visual record is obtained.

Most types of electrical recording instruments provide either for photographic or pen recording. Each of these types has certain advantages and disadvantages which govern the applications for which it is suitable. The photographic type recording permits greatest sensitivity and rapidity of recording while the moving pen type of recording instrument produces a record visible from its inception and without the need for employing the somewhat complicated and always expensive methods of photographic reproduction. In a number of different applications it would be extremely advantageous to be able to have an electrical recorder which would combine the major advantages of the two systems, i. e., the sensitivity and recording speed of the photographic type recording with the immediate availability and simplicity of the recording process in pen type recorder.

It is an object of this invention to provide an electric recording system combining the major advantages of both the photographic type recorder and the pen type recorder. Another object of this invention is to provide an electrical recording apparatus by means of which the variations in a set of electrical waves are translated into a coordinated series of time pulses of electricity repeatedly applied to different selected ones of a plurality of stationary contactors, each adapted to produce a visual indication in the form of a dot or small mark upon a moving strip of record paper. A still further object of this invention is to provide a recording of the deflection from a galvanometer upon a moving strip of non-shielded paper (i. e. from which light is not excluded) rapidly and as a function of time, so that on the resultant record the variations in deflections of the galvanometer may be determined. Further objects, and corresponding advantages of my invention over the prior art, will be apparent from this specification.

The attached sheets of drawings illustrate various embodiments of my invention which are included for ease of explanation of the principles involved and which are not to be taken as limiting the scope of the invention. In the figures, the same reference numeral refers to the same or a corresponding part.

Figure 4 shows a second embodiment of the invention.

Figure 7 is a wiring diagram of a third embodiment of the invention.

Figure 8 illustrates a modification of the recording apparatus in which timing marks are applied to the record.

In this invention the recording is made on a moving strip of voltage-sensitive paper. Such a paper is defined as that which changes a visual characteristic upon the passage therethrough of electric current. Thus, for example, ordinary paper without any treatment whatsoever can be used in this system if spark recording is used, i. e., if a high current is passed through the paper to burn, discolor, or make a sharp hole. However, I prefer to use a special paper manufactured by the Western Union Company and called Teledeltos paper. This paper, or its equivalent, produces a definite dark mark against a much lighter background whenever on its surface a voltage is applied between two conductors touching the paper surfaces. Thus, when a conducting backing plate is placed on one side of a strip of Teledeltos paper and a small diameter electrode is applied to the other surface, a voltage surge applied between these two electrodes will produce a dark dot on the surface.

For the recording system, I use a plurality of spaced electric contactors which are aligned in a direction substantially perpendicular to the motion of the voltage-sensitive strip. These contactors are small in diameter, are spaced closely together, but are insulated from each other. These are mounted on one side of the strip, and on the other side is at least one conducting backing plate. This may be replaced by a second set of spaced contactors if desired. A pulse of current is applied between a selected one of the contactors and backing plate periodically. The particular contactor to which this pulse is applied depends upon the voltage to be recorded and changes therewith. Thus, a record is produced using stationary recording members (the contactors and backing plate), producing a series of dots on the moving Teledeltos strip, the switching mechanism serving to select automatically and periodically the one of the aligned contactors to which the current pulse is applied.

Figure 1:
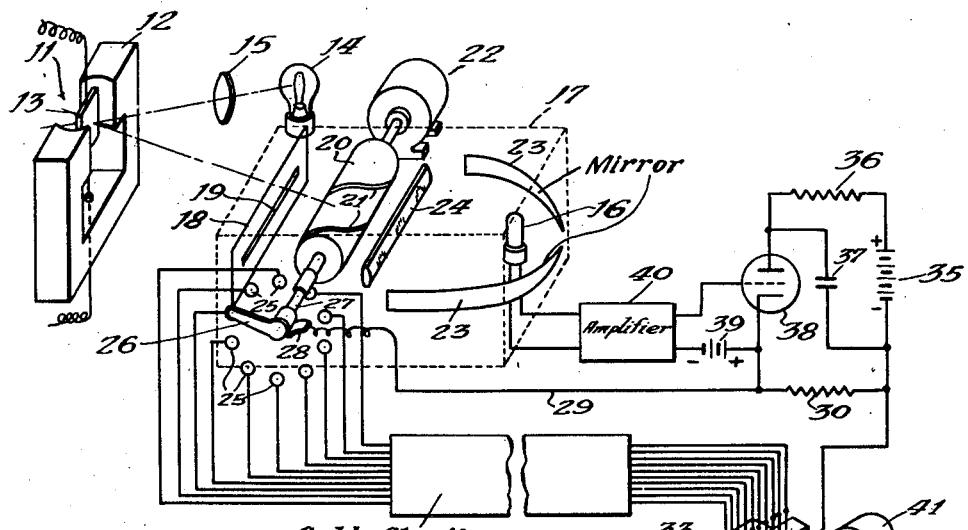
Figure 1 illustrates one embodiment of my invention, as applied to the recording of the deflection of a galvanometer.

Referring now to Figure 1, a galvanometer 11 of any conventional type provided with a magnetic system 12, is shown. Mounted on this galvanometer 11 is a small mirror 13. Light source 14, which may conveniently be a small electric bulb, is supplied with a lens 15 so that the mirror is illuminated from the light source. A beam of light is reflected from the mirror, the light converging to a point at some distance in front of the mirror depending upon the focal length of the lens 15 and the arrangement of the optical system. A photoelectric cell 16 is mounted in a light-tight box 17 (shown in dotted lines in Figure 1 so that the contents may be seen). Across the front of this light-tight box is mounted a mask 18 in which is cut a long slit 19. The mask and slit are aligned with the galvanometer mirror 13, light source 14 and photoelectric cell 16, in such a way that if the galvanometer mirror 13 is rotated due to the electrical signal, a relatively large and concentrated part of the reflected light passes at each instant through the slit 19. Of course, this slit does not have to be of any particular dimensions as far as width is concerned, since it is not expected that it will limit the light entering the box, whereas the length of the slit defines the limits of galvanometer deflection which will be recorded.

Figures 2, 3:
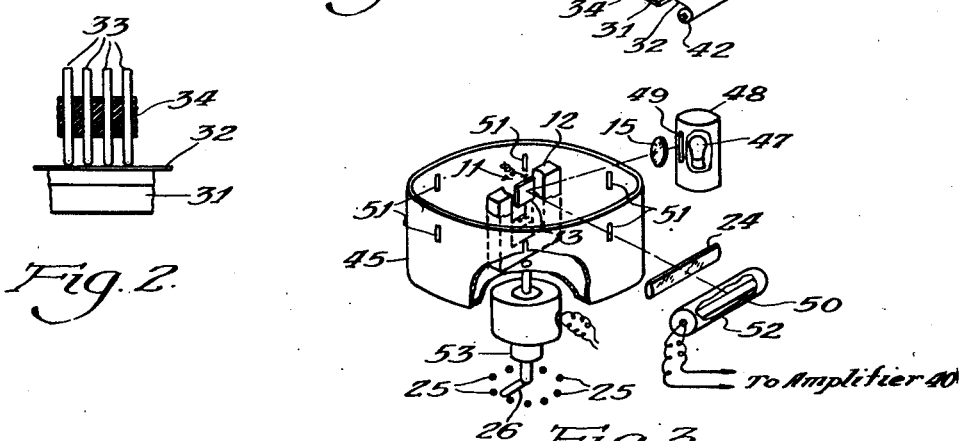
Figure 2 is an enlarged detail of a portion of the recording apparatus shown in Figure 1.
Figure 3 illustrates a second type of scanning system alternative to that shown in Figure 1.

Mounted between the mask and photoelectric cell is a scanning means which in Figure 1 consists of a hollow cylinder 20 closed at the ends and rotatably mounted about its axis in the box 17. This cylinder is of opaque material except for two substantially transparent spiral regions 21 on opposite sides of the cylinder. Each of these spirals is preferably a uniform spiral which completes one full revolution about the cylinder from one end to the other. The two spirals are placed on opposite sides of the cylinder so that at any degree of rotation of this cylinder they define a narrow path through which light reflected at a certain angle from mirror 13 and passing through the slit 19 in mask 18 can penetrate towards the rear of the box. The cylinder 20 is rotated by an electric motor 22 or by any other convenient means. The length of the cylinder, or more correctly the length of the cylinder on which the spiral zones exist, should be approximately equal to or slightly greater than the long dimension of slit 19. Within the box and behind the scanning cylinder I prefer to locate two curved mirrors 23. These mirrors are curved to such an extent that light reflected from mirror 13 and passing through the scanning system will in all cases, and regardless of the rotation of cylinder 20, be reflected upon the active surface of the photocell 16. Preferably, but not necessarily, a cylindrical convex lens 24 is interposed between the mirrors 23 and the scanning cylinder 20 merely to concentrate the light passing by that point. It is apparent from this description that the scanning means within box 17 defines a relatively narrow light path from the mirror 13 to the photocell 16, and that the scanning system is adapted upon rotation of the cylinder 20 to vary periodically this path from one limit of deflection of the galvanometer to the other, each period being defined as the time taken for one rotation of this cylinder 20. It is likewise apparent that the mirrors 23 can be eliminated if a long photocell is mounted longitudinally in the back of the box or if a long Photronic cell or similar light-sensitive device is thus employed, so that there is no need of reflecting the deflected beam which has passed the scanning cylinder. Such a device is shown in Figure 3 and is subsequently described.

A selector system is employed, operating in synchronism with the scanning system. One example of such a selector system is shown in Figure 1. Here there are a multiplicity of points 25 spaced around the periphery of a circle and contacted each in turn by a switch blade 26. This switch blade is rotated in synchronism with the motion of the cylinder 20 by attachment thereto through a non-conducting shaft 27. Bearing against the cylindrical position of the blade 26 is a wiping contact 28 connected to a conductor 29, which in turn is connected through a resistor 30 to a conducting backing plate 31, which is mounted in contact with one surface of a moving strip of voltage-sensitive paper 32, which preferably is the Teledeltos paper described above. A plurality of aligned and mutually insulated electric contactors 33, which are preferably mounted in a straight line on a strip of insulation 34, are arranged so that one end of each contactor 33 bears against the opposite side of the voltage sensitive paper 32 from that in contact with the backing plate 31. Each of the contactors 33 is connected through a conductor of the multiple conductor cable 34 to a corresponding switch point 25. Thus, if one end of contactor 33 is connected to a particular switch point, the adjacent switch point is connected to the adjacent electrical contactor, and so on, so that the connection to the switch points corresponds to the alignment of the contactors. It is apparent that contact of the blade 26 with a point 25 closes to a circuit through resistor 30, the backing plate 31, paper 32, one contactor 33, and back to the switch point. It is also apparent that each switch point is connected through the corresponding contactor to the switching system once during each period of rotation of the scanning cylinder 20, i. e., during one complete variation of the permissible light path from the mirror 13 to the photoelectric cell 16.

A battery 35 is connected through a high resistance 36 across a condenser 37 which is in parallel with a Thyratron 38 or equivalent tube maintained in a non-conducting condition by means of the grid bias battery 39 or other source of potential applied in the grid-cathode circuit. However, the amplifier 40, which is actuated by the electric signal generated by the photoelectric cell 16, is adapted to produce a pulse upon illumination of the photocell 16 which reduces the negative potential on the grid of the Thyratron 38, thus permitting this tube to ionize or fire. This results in the discharging of condenser 37, which for the purposes of this specification can be considered a source of electricity, through tube 38 and resistor 30, thus temporarily applying a surge of potential across resistor 30. Since resistor 30 is connected in parallel with the electric circuit, including one point 25 of the selector switch and a corresponding single electric contactor 33 and backing plate 31, it is apparent that a surge of potential is, therefore, applied across the Teledeltos strip 32 at one point, thus producing a dark dot at that point. Resistance 36 is purposely chosen to be sufficiently high so that after condenser 37 has partially discharged, the arc in tube 38 extinguishes, thus switching off the potential across resistor 30 and stopping the discharge of the voltage source. Thereafter condenser 37 recharges. Since the scanning cylinder 30 completes one complete variation of the possible light path by which light reflector 13 can reach the photoelectric cell 16 once each revolution, photocell 16 must be illuminated once each period; amplifier 40 must, therefore, produce a pulse causing the Thyratron 38 to switch on once each period, and condenser 37 must discharge in that instance through resistor 30 and through the Teledeltos paper. The exact time during any one such period at which the signal from the photoelectric cell occurs depends directly upon the degree of the deflection of the galvanometer. Thus, if the galvanometer were deflected to the extreme left end of its limit of travel, the signal from photoelectric cell 16 would appear at the start of each scanning period, whereas if the galvanometer were undeflected, the signal would appear at the middle of each period, and so on.

Furthermore, since the motion of the scanning means is directly synchronized with the motion of the blade 26 past the switch points 25, one of the plurality of circuits connecting the individual electric contactors 33 across resistor 30 must be closed at the time when the Thyratron 38 is switched on, again depending upon the deflection of the galvanometer 13. The visual indication produced on the strip is accordingly one dot each period, the location of which is directly related to the degree of deflection of the galvanometer mirror 13.

The Teledeltos strip 33 is moved in a direction substantially perpendicular to the direction of alignment of the contactors 33 by an electric motor 41 or similar means, which is attached to the take-up 42. The paper originally is spooled on a delivery reel 43. If the motor 41 moves substantially uniformly, the paper will be moved approximately linearly past the contactors, and the series of dots produced (one per each scanning period) will clearly indicate on the Teledeltos strip the time variation of the deflection of the beam of light reflected from the galvanometer mirror 13. The shorter the scanning period is with respect to the movement of the strip 32, the more dots will be produced on this strip for a given motion of this strip. This relation can be adjusted to suit the convenience of the operator.

From the description given above, it is immediately apparent that the deflection of a plurality of galvanometers 11 can be accomplished by employing a plurality of systems shown in Figure 1, and that if desired, the contactors 33 for all such systems may be mounted on a common insulating strip and recorded on a common broad strip of paper.

Numerous modifications of the scanning system described can be made without departing from the spirit of this invention. One such alternative system is shown in Figure 3. Here certain parts are broken away for convenience in representation. In this system the galvanometer 11 is mounted concentric with the axis of a masking cylinder 45, which is rotated by a motor 46. A light source 47 mounted within an opaque shield 48 fitted with slit 49, is mounted adjacent the mirror 13 of the galvanometer with a lens 15 interposed therebetween. The light path between the source 47 and the mirror 13 is unobstructed. A long photoelectric or Photronic cell 50 is mounted approximately parallel with the rest position of the mirror 13. A plurality of slits 51 are cut in the periphery of cylinder 45 at such an elevation in the cylinder that when any such slit is aligned between the mirror 13 and the Photronic cell 50 there is an unobstructed light path from the mirror 13 to the light-sensitive cell 50. Preferably slits 51 are cut at equal distances apart in the periphery of the cylinder 45. The light-sensitive cell 50 is preferably enclosed within a shield 52, along one side of which (exposed to light coming through slits 51) is cut a long, relatively narrow slit (not shown). As the cylinder 45 is rotated the slits 51 are moved across the possible paths of light from mirror 13 to the light-sensitive cell 50, thus periodically scanning the region traversed by this beam of light. Once during the time between which adjacent slits 51 occupy the same position in space is such a slit aligned with the light beam reflected from mirror 13, thus permitting the light-sensitive device to generate a signal at that particular time. The leads from the light-sensitive cell are connected to amplifier 40 shown in Figure 1. If it is desired to increase the amount of illumination on this light-sensitive device, a convex cylindrical lens 24 may be mounted in front of the slit on the shield 52, thus concentrating more of the beam of light passing through the slit 51 on the light-sensitive cell. From the description of the device shown in Figure 1, it is apparent that the selector switch blade 26 must complete its cycle of contacts on the switch points 25 during the time of transit of adjacent slits 51 past the same point. In the scanning system of Figure 3, the switch blade must be rotated N times as fast as cylinder 45 is rotated, where N represents the number of slits 51. In Figure 3 this is accomplished by connecting the shaft of the motor 46 to the switch blade 26 through a gear box 53, which will rotate blade 26 N times as fast as the rotation of the motor shaft. Switch points 26 are connected through a multi-conductor cable 34 to the contactors 33, as shown in Figure 1. Motor 46 is attached to a suitable source of potential in the same manner as motor 22 of Figure 1.

Attention is called to the fact that in this embodiment of the invention the mirrors 23 shown in Figure 1 are dispensed with entirely, and in their place a long light-sensitive cell 50 is employed. As was discussed above, this same system may be employed instead of using the photoelectric cell 16 and mirrors 23 in the device shown in Figure 1. The remainder of the apparatus used in connection with the scanning system shown in Figure 3 can conveniently be the same as is represented in Figures 1 and 2.

Another embodiment of the invention, in which there is no need to employ a galvanometer and photocell arrangement, is shown in Figure 4. Here the input signal to be recorded is applied between terminals 60. The blade of a rotary switch 61 is connected to one of these terminals. The multiple points of this switch 61 are connected, preferably at uniform intervals, to a potentiometer or voltage divider made up of tapped resistor 62 and voltage source 63. The switch points are arranged so that there is a definite predetermined difference of potential between each adjacent pair of switch points. Such differences of potential may be equal or unequal as desired. For example, they may bear a constant ratio of magnitudes. One end of the tapped resistor 62 is connected to ground. The cathode of a vacuum tube 64 is likewise connected to ground through an adjustable resistor 65, by means of which a positive biasing potential is applied to the cathode. The input terminal 60 which is not connected to the blade of switch 61 is connected to the control grid of tube 64. The voltage applied between cathode and control grid of this tube therefore consists of a fixed biasing component due to resistor 65, a periodically changing voltage due to actuation of the blade of switch 61 in a definite predetermined relationship, and an undetermined voltage across terminal 60. The blade of switch 61 is rotated at a constant and preferably high speed by means of a prime mover 66 which may be, for example, a small electric motor. The dotted lines shown in Figure 4 are the usual mechanical connections between the blades of the rotary switch 61 and a second similar rotary switch 67, the purpose of which will be subsequently shown.

Due to the rotation of the blade of switch 61, a stepwise variation in voltage is applied to the grid of tube 64. This voltage variation is shown by line 68 in Figure 5. This voltage renders the grid negative with respect to ground, first by the maximum voltage of battery 63 and subsequently by lower amounts as the blade of switch 61 is rotated until finally there is no voltage applied in the grid circuit of tube 64. This cycle then repeats at each revolution of the switch blade. Additionally, the cathode of tube 64 is biased positively with respect to ground by means of the drop through resistor 65. It is to be noted that the lower end of resistor 65 is connected to the negative terminal of the plate source 69 and that the upper end of this resistor and the cathode of the tube are connected to the positive terminal of battery 69 through resistors 70 and 71. Accordingly the positive bias on the cathode of tube 64 can be adjusted as desired. This bias is the voltage $E_c$ shown in Figure 5. It is normally desirable to adjust $E_c$ such that when no signal is applied across the terminals 60, no plate current flows in tube 64 through resistors 72 and 71. The screen grid of tube 64 is maintained at an adjustable positive potential by means of a sliding contact on resistor 70. Under the conditions outlined above the transfer characteristic, or variation in plate current with variation in grid voltage, will follow the graph shown in Figure 6. This requires that tube 64 be a sharp cut-off pentode, for example a 6SJ7, although any similar type of tube may be employed. It is to be noted that for any negative grid bias $E_c$ greater than that required to cause current to flow, tube 64 is rendered inoperative, regardless of the total variation in grid voltage due to the rotation of the blade of switch 61. However, as soon as a positive signal voltage is applied between terminals 60, plate current $I_p$ will flow at some point in the time cycle during each rotation of switch 61. This can be explained by reference to Figure 5. Let it be assumed that line 73 is the plot of applied signal voltage increasing in amplitude as a function of time. Since this voltage is applied in series with the fixed cathode bias $E_c$ and the cyclically varying voltage due to the operation of switch 61, as long as the total voltage, i. e. the sum of all three of these components, is negatively greater than E shown in Figure 6, no plate current flows. However, it will be noted that at point $t_1$ in Figure 5 the sum of these voltages is less than E, and that at this point plate current abruptly begins to flow. This current stops flowing at time $t_2$ and recommences at time $t_3$. Here again the sum of all three component voltages applied in the grid cathode circuit of tube 64 becomes less than E. From an inspection of Figure 5 it is apparent that the time interval between $t_0$ and $t_1$ or between $t_2$ and $t_3$ depends on the magnitude of the positive signal voltage applied across terminal 60. Thus the time at which the signal is put out by tube 64 each time after the cyclical maximization of the negative voltage in the grid circuit of tube 64 depends upon the variation in the applied signal voltage.

The signal output across resistor 72 is coupled through condenser 74 and grid resistor 75 to a second amplifying pentode 76 which is conventionally biased by resistors 77 and 78. The output signal of this tube across resistor 79 is inverted from that across resistor 72. This signal is coupled by condenser 80 and grid resistor 81 to the grid of a gaseous discharge tube 82 such as a Thyratron or grid-glow tube. I have found, for example, that a type 2050 tube is satisfactory for this purpose. The grid of this tube is supplied with an adjustable negative bias by battery 85 and potentiometer 86. The plate of this type is supplied with a high positive voltage due to batteries 69 and 83, through a high resistance 84. From the plate of tube 82 to ground and backing plate 31 there is connected a condenser 87 to serve as the voltage source. The cathode of the tube 82 is connected to ground through a resistor 88. Another line from the cathode of this tube goes to the arm of the multi point switch 67. The points of switch 67 are connected through insulated leads to the contactors 33 of a recording system which can be identical with that shown and described in connection with Figure 1; that is, the contactors 33 bear on a moving strip of Teledeltos paper 32 against which is placed a backing plate 31 which is grounded. There should be the same number of points on switch 67 and switch 61 and the same order of connecting the points of switch 67 to the contactors 33 should be employed as that used in connecting points of switch 61 to the voltage divider 62. Hence when any contact of the multipoint switch 67 is closed, there is a series circuit from the positive side of condenser 87 through tube 82, switch 67, a selected contactor 33, the voltage-sensitive strip 32, and backing plate 31 to the negative side of condenser 87.

Figures 5, 6:
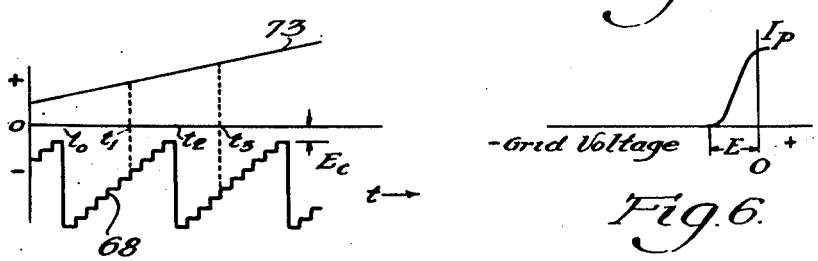
Figure 5 is a graph of certain voltage-time relationships in the circuit shown in Figure 4.
Figure 6 is a graph of variation in plate current with variation in grid voltage of the first vacuum tube shown in Figure 4.

In operation, switches 61 and 67 are rotated at a high rate of speed such that the time interval $t_0$—$t_2$ in Figure 5 is less than the time for a considerable change in magnitude of the input signal voltage across terminal 60. In a single cycle of operation, for example from the time $t_0$—$t_2$ shown in Figure 5, there is initially no electrification of any contactor 33 pressing against the moving strip of Teledeltos paper. However, at the time $t_1$ the voltage between grid and cathode of tube 64 has decreased to such a point that plate current flows in this tube, thus producing an amplified signal across resistor 81 in the grid circuit of the gaseous tube 82. This tube thereupon fires. The condenser 87 is discharged very rapidly to ground. Since resistor 88 is relatively large, for example 10,000 ohms, the major part of the momentary surge of current caused by discharge of condenser 87 through the tube is dissipated not through resistor 88 but through the series circuit including one selected contactor 33, the Teledeltos paper strip 32 and the backing plate 31, back to the grounded side of condenser 87, thus producing a dot or spot on this paper. The particular contactor 33 which is electrified depends upon the position of switch arm 67. The position depends upon the time intervals $t_0$—$t_1$ and represents a certain rotation after the time $t_0$ during which the arms of switches 61 and 67 have synchronously progressed a certain arcuate interval. As soon as condenser 87 discharges to a voltage lower than the arc drop across tube 82, this tube ceases firing and condenser 87 is subsequently recharged through the high resistance 84. This resistance and the size of condenser 87 are chosen such that the condenser 87 is relatively slowly recharged. Of course, tube 82 will not refire unless a signal is reapplied to the grid of this tube, which will not occur until there is an abrupt change in the flow of current through resistor 72 in the positive direction. On the next cycle of operation during the time interval after $t_2$, the surge of current through resistor 72 will occur at a time $t_3$ which is earlier in the cycle, since the positive signal amplitude is now greater than it was before. Therefore an earlier switch point of switch 67 will be electrified and the dot on the Teledeltos paper will be applied through a different contactor 33. It is apparent therefore that within a range of amplitude of voltage determined by the difference of potential of battery 63 that for any positive signal voltage applied across terminal 60, a dot will be applied to the strip of Teledeltos paper at a point representing the amplitude of the input signal at a particular time during each cycle of rotation of switch arms 61 and 67. As stated above, these arms are rotated at such a speed and each cycle of operation is sufficiently short so that there cannot be a marked change in amplitude of the signal voltage applied across terminal 60 during the cycle.

One disadvantage with the apparatus shown in Figure 4 is that the signal applied across terminal 60 must be of a positive potential in order to actuate the recording apparatus. Of course, if the recorded voltage is always negative, it is merely necessary to connect the battery 63 with opposite polarity and rotate the contact arm of switch 61 in the opposite direction. Then, the voltage component due to action of this switch is a positive component varying each cycle from an initial value of zero to a positive maximum. At some point in each cycle, tube 64 has a grid voltage less than E (Figure 6), and tube 82 fires.

A third simplified variation of the recording system is shown in Figure 7. Here the responsive element of the system is a sensitive polarized relay 110. The coil of this relay is connected in series with a retarded relay 111 between one of the two input terminals 60 and the arm of a rotary switch 112 which can be constructed like switch 61 in Figure 4. The multiple points of this rotary switch 112 are connected to taps on a voltage divider 113, so that increments of voltage drop appear across adjacent points. The total range of voltage drop across voltage divider 113 is adjusted by setting potentiometer 114 across which is a substantially constant voltage source 115. The arm of rotary switch 112 is suitable arranged to be rotated, preferably at a high rate of speed, through an insulated connection shown as a dotted line in Figure 7.

One terminal point of this switch is connected across a resistor 116, the other end of which is connected to the other terminal 60. A voltage drop $E_1$ is produced across resistor 116 through potentiometer 117 which is connected across a substantially constant voltage source 118. It is apparent that across the coils of the sensitive polarized relay 110 and the retarded relay 111 appears the algebraic sum of three voltages, $E_1$, $E_2$ and the signal voltage $E_3$ across terminals 60. The signal voltage applied across terminals 60 is connected such that it opposes voltage $E_2$ due to the resistor switch. The coil of polarized relay 110 is arranged to close the contacts of this relay whenever a predetermined voltage of one polarity appears across the coil. Such voltage, for example, could be provided by the voltage $E_1$. Obviously in the circuit shown, voltage $E_1$ will appear across relays 110 and 111 only when voltages $E_2$ and $E_3$ are equal and opposite. At this instant the sensitive relay closes the contacts 119. The coil of relay 111 is wound to close its contact arm at the same current as that of relay 110. However, this action is retarded, so that the contacts of relay 110 close slightly before those of relay 111 open.

A second switch or selector 120 is mounted and mechanically connected so that the arm of this switch rotates in synchronism with that of switch 112. There are the same number of multi-contacts on switches 120 and 112. The points on switch 120 are connected in turn to the spaced contactors 33 on the recording apparatus of the type shown in Figure 1. The backing plate 31 of this recording system is connected to one side of a condenser 121 and a voltage source 122. The other side of the voltage source is connected to the other side of the condenser through large resistor 123. The switch arm of switch 120 and the common point between the condenser 121 and resistor 123 are connected in series to the contacts of sensitive relay 110 and those of retarded relay 111.

The action of this circuit valve resembles that shown in the previous circuits. As the switch arm 112 is rotated, for example, at high speed, by an electric motor (not shown) in the fashion described in connection with Figures 1 and 4, the voltage $E_2$ varies cyclically in a predetermined manner. The total voltage applied across the coils of relays 110 and 111 comes to a predetermined value at a definite polarity only once each cycle, at the point at which there is a given relationship between the voltages $E_3$ and $E_2$. The voltage $E_1$ can be arranged so that this particular point occurs at the instant when $E_3$ and $E_2$ are substantially equal and opposite. The contacts of relay 110 close at this instant, applying the voltage across the charged condenser 121 through one of the contactors 33, the voltage sensitive paper 32 and the backing plate 31. The particular one of the contactors 33 which is electrified is determined by the position of resistor switch arm 120 at the instant that these contacts close. This, of course, bears a predetermined relationship to the voltages existing in the relay coil circuit and varies with the variation in position of the switch arm 112. It is apparent, therefore, that the recording on the Teledeltos paper will be a series of dots placed on the paper at amplitudes corresponding to the amplitude of the voltage across terminals 111 at the instant at which the contacts of relay 110 close. Since the contacts of relay 111 open very shortly thereafter, the condenser discharge circuit is closed only momentarily. After this point, relay 111 opens this circuit, and condenser 121 is recharged through charging resistor 123. Actually, condenser 121 need not be employed at all, but by its use a slightly smaller more concentrated mark is applied to the Teledeltos paper.

Relay contacts 110 are closed until the arm on switch 112 reaches the first contact point on a new cycle. Then they open, and do not reclose until the closing voltage of proper polarity is across the energizing coil of this relay.

It is often desirable to impress upon the record as it is being made, a plurality of timing marks which are spaced at uniform intervals of time. This may be accomplished in the systems disclosed in the previous figures by application of the principles already described. One illustration of such a system is shown in Figure 8. Closely adjacent the alignment of contactors 33 is a second alignment of contactors 125. These contactors 125 are all connected together and may be in contact with each other at the strip 32, i. e., the series of contactors 125 may be replaced if desired by a single long knife edge touching the paper strip 32. The contactors 125 are all connected to a single point 126 which is adapted to make connection to any one of a plurality of conducting arms on a timing wheel 127. This timing wheel is driven at a constant speed, by conventional means now well known in the art. This timing wheel 127 is maintained at a potential above ground by a source of potential 128. Thus, whenever contact 126 is connected to one of the arms on toothed wheel 127, the contactor or contactors 125 are raised to a potential above ground and a series of aligned dots across the paper, or a single line (if a knife edge contact is used) is produced on the paper. In the embodiment shown, where toothed wheel 127 is driven at 10 revolutions per second, there are 10 arms which are equally spaced around the periphery of the wheel. Preferably two of the arms are arranged to have extended contact with contact 126 so that every fifth mark is of longer duration than the others and every tenth mark is still further increased in length.

The various embodiments of the invention which have been shown are obviously but a few of the many that can be arranged utilizing the principle described. In each of such systems there is present a recording system including a plurality of spaced contactors, a strip of voltage sensitive paper moving approximately at right angles to the aligned contactors, and a backing plate on the other side of the voltage sensitive strip, a selector circuit cyclically connecting each of the contactors in series with the voltage source and a switching means, and a scanning circuit adapted to close the switching means once during each cycle of the selector means, at the instant at which a predetermined relationship exists between a quantity associated with the signal voltage to be recorded and a corresponding variable quantity cyclically varied by the scanning means in synchronism with the operation of the selector circuit. The end product of any of these systems is the same; namely, a series of small marks on the strip of voltage-sensitive paper, one produced during each cycle of the selector, and synchronization means, in an amplitude relationship determined by the amplitude of the signal voltage at one instant during each cycle. The circuit is adapted to produce a permanent record on a record strip of the voltage variation in a circuit without the need for maintaining the record strip in the dark during the time that the record is being made, and without the limitations on pen type recorders as to low frequency response.

I claim:

1. Apparatus for recording electric voltages on a voltage-sensitive strip, including means for moving said strip, a plurality of spaced contactors arranged substantially perpendicular to the direction of motion of said strip and in contact therewith, a conducting backing plate on the opposite side of said strip adjacent said contactors, a source of marking voltage, said source including an electric condenser and means to charge said condenser to a predetermined maximum value through a high resistance, a switching system including a gas discharge tube, a selector system for connecting in series periodically and in turn each of said contactors with said backing plate, said gas discharge tube, and said condenser, means operating in synchronism with the operation of said selector system for producing a balancing voltage of amplitude varying periodically in a regular fashion from a maximum to a minimum value, said period of variation being less than the time during which there is a substantial change in the amplitude of said electric voltages, a vacuum tube amplifier including a plurality of amplifying tubes, the control grid of at least one of said tubes being normally biased beyond cut-off so that no plate current normally flows, circuit means for impressing between said control grid and cathode of said at least one of said tubes said electric voltages and said balancing voltage, whereby plate current flows periodically whenever the amplitudes of said electric voltages and said balancing voltage bear a fixed predetermined value, said flow of plate current causing a momentary signal in the output of said amplifier circuit, means for applying the output of said amplifier to the grid circuit of said gas discharge circuit whereby said gas discharge tube is fired upon occurrence of said momentary signal, causing said condenser to discharge momentarily through said selected contactor and said backing plate, producing a visible mark on said voltage-sensitive strip at each such discharge.

2. Means for recording electrical voltages on a voltage-sensitive strip including means for producing a light beam, means for deflecting said beam in accordance with said waves, means for moving said strip, a plurality of spaced electrical contactors aligned substantially perpendicularly to the direction of motion of said strip and bearing on one side thereof, a corresponding backing plate on the other side of said strip, a source of voltage, a switching system, a selector system for periodically connecting in turn each of said contactors in an electric circuit including said switching system and said voltage source, a scanning system including light sensitive means capable of producing an electrical signal upon illumination, means for permitting light deflected only along a predetermined path to reach said light sensitive means, and means for cyclically varying said permitting means in synchronism with operation of said selector system, whereby said predetermined path is varied each cycle between two limits defining the maximum deflection of said light beam, said light sensitive means being connected to said switching system, whereby said switching system is actuated to close said electric circuit whenever said light sensitive means is illuminated by said light beam, thus causing current to flow through one of said electric contactors, said strip and said plate to produce a visual indication on said strip.

3. Apparatus for recording on a strip of voltage-sensitive paper the deflection of a galvanometer which varies between known limits as some function of time, including a light source adjacent said galvanometer, a mirror mounted on said galvanometer and illuminated by said light source, light-sensitive means mounted in the path of light reflected from said galvanometer mirror and capable of generating an electric signal when illuminated, scanning means disposed between said mirror and said light-sensitive means defining a narrow path for light from said mirror to said light-sensitive means, said scanning means being adapted to vary said path periodically from one to the other of said limits of deflection of said galvanometer, selector means including a plurality of points and means for contacting each such point in turn, said contacting means being adapted to move in synchronism with the variation of said path, a plurality of aligned contactors equal to the number of said points and insulated from each other, a conducting backing plate close to said contactors, said contactors and said plate being separated by and in contact with said strip of paper, means for moving said strip past said contactors approximately perpendicular to the direction of alignment of said contactors, a source of voltage, switching means associated with said souce normally maintaining it in a non-discharging condition, a plurality of electric circuits associated with said selector means whereby each one of said contactors is periodically connected in series with one of said points and through said strip to said backing plate, said source, said switching means and said contacting means, and means responsive to the generation of said electric signal for causing said switching means to discharge said voltage source through one of said circuits upon illumination of said light-sensitive means.

4. Apparatus for recording on a moving strip of voltage-sensitive paper the deflection of a galvanometer which varies between known limits as some function of time including a mirror mounted on said galvanometer, a light source adjacent to and illuminating said mirror, light-sensitive means capable of generating an electric signal upon illumination, scanning means disposed between said light-sensitive means and said mirror defining a small opening periodically moving across the beam of light reflected from said mirror between said limits, means for deflecting light from said mirror passing through said opening on to said light-sensitive means, a selector switch including a plurality of points and a blade contacting each such point in turn, means for synchronizing the motion of said blade with the periodic movement of said opening so that said blade contacts all points during one period of motion of said opening, a plurality of closely spaced aligned contactors equal to the number of said points and insulated from contact with each other, a conducting backing plate mounted adjacent the ends of said contactors and separated therefrom by said strip, means for moving said strip past said contactors substantially perpendicular to the alignment of said contactors, a source of voltage, switching means for controlling said source, a plurality of electric circuits associated with said selector switch whereby each of said contactors is periodically connected in turn with only one of said points, said backing plate, said source of voltage and said switching means, and means controlled by said light-sensitive means for closing said switching means momentarily upon generation of said electrical signal.

5. A recording apparatus for recording electric phenomena having a changing amplitude wherein a record is made on a voltage-sensitive chart, including means for moving said chart, a plurality of spaced contactors arranged substantially transverse to the direction of motion of said chart and in immediate proximity therewith, a conducting backing plate on the opposite side of said chart adjacent to said contactors, a source of marking voltage including an electric condenser and means to charge said condenser to a predetermined maximum value through a high resistance, a switching system including a gas discharge tube, means for connecting periodically and in turn each of said contactors in series with said backing plate, said gas discharge tube, and said condenser, responsive means for actuating said switching system, and means acting on said responsive means and operating in synchronism with the operation of said selector system for impressing on said responsive means the sum of said changing amplitude and of a periodically varying amplitude of an electric phenomena a response of said responsive means for applying a voltage on the control grid of said tube necessary to cause ionization therein when said varying amplitude bears a fixed relationship to said changing amplitude, whereby said condenser is periodically discharged through said tube, said selected contactor and said backing plate, producing a visible mark on said voltage-sensitive chart at each such discharge.

6. A recording apparatus for recording the amplitude of an electric potential wherein a record is made on a voltage-sensitive strip, including means for moving said strip, a plurality of spaced contactors arranged substantially transverse to the direction of motion of said strip, a conducting backing plate on the opposite side of said chart adjacent to said contactors, a source of voltage, said source including an electric condenser, and means to charge said condenser to a predetermined maximum value through a high resistance, a switching system including a gas discharge tube, a selector system for connecting periodically and in turn each of said contactors in series with said backing plate, said gas discharge tube, and said condenser, means operating in synchronism with the operation of said selector system for producing a voltage of amplitude varying periodically and in a regular fashion from a maximum to a minimum value, said period of variation being less than the time during which there is a substantial change in the amplitude of said potential, means for impressing in a single electric circuit in opposition said potential and said varying voltage, means responsive to the total voltage in said single electrical circuit and operating on said gas discharge tube to cause ionization therein whenever said total voltage reaches a predetermined value, whereby said condenser is periodically discharged directly through a selected contactor and said backing plate, producing a visible mark on said voltage-sensitive strip at each such discharge.

7. Apparatus for recording an electric signal voltage on a voltage-sensitive record strip including means for moving said strip, a plurality of spaced contactors arranged substantially perpendicular to the direction of motion of said strip and in contact therewith, a conducting backing plate on the opposite side of said strip adjacent said contactors, a source of marking voltage, a switching system for controlling the application of said marking voltage to said strip, a selector system for periodically connecting in turn each of said contactors to said switching system and said marking voltage source, means operating in synchronism with the operation of said selector system for producing a balancing voltage varying periodically in a predetermined manner, means for combining the amplitudes of said received signal and said balancing voltage and means responsive to the resultant amplitude of said balancing voltage and said signal voltage for momentarily closing said switching system whereby said marking voltage is applied across one of said contactors and said backing plate when said balancing voltage bears a fixed and constant relationship to the amplitude of said signal voltage.

8. Apparatus for recording an electric signal voltage on a voltage-sensitive record strip including means for moving said strip, a plurality of spaced contactors arranged substantially perpendicular to the direction of motion of said strip and in contact therewith, a conducting backing plate on the opposite side of said strip adjacent said contactors, a source of marking voltage, a switching system for controlling the application of said marking voltage to said strip, a selector system for periodically connecting in turn each of said contactors to said switching system and said marking voltage source, means operating in synchronism with the operation of said selector system for producing a balancing voltage of amplitude varying periodically in a regular fashion from a maximum to a minimum value, said period of variation being less than the time during which there is a substantial change in the amplitude of said signal voltage, and means for combining said signal voltage and said balancing voltage in opposition in a single electric circuit, and for applying a potential proportional to said signal and said balancing voltage to the input of said switching system whereby said switching system is momentarily actuated and said marking voltage is applied across one of said contactors and said backing plate when the algebraic sum of the amplitudes of said signal voltage and said balancing voltage reaches a predetermined value.

9. A recording apparatus wherein a record of electric voltage is made on a voltage-sensitive chart, including means for moving said chart, a plurality of spaced contactors arranged substantially transverse to the direction of motion of said chart, at least one additional contactor located on the opposite side of said chart from said contactors, whereby said at least one additional contactor and said spaced contactors form a spaced series of electrode pairs in immediate proximity to the surface of said chart, a source of marking voltage, a selector system for periodically connecting repeatedly and serially said electrode pairs in series with said voltage source cyclically varying means for repeatedly varying an electromagnetic circuit over a predetermined operating range of amplitude in synchronism with the periodic connections of said selector system whereby the connection of each said electrode pair to said voltage source and said switching system corresponds to a predetermined amplitude of said electromagnetic circuit, and switching means in series with said voltage source and said electrode pairs responsive to the amplitudes of said electric voltages and of said electromagnetic circuit for causing current flow from said voltage source only upon occurrence of a predetermined relationship in said amplitudes, whereby momentarily a marking voltage is applied across one of said electrode pairs.

10. Apparatus for recording electric signal voltages on a voltage-sensitive strip, including means for moving the said strip, a plurality of spaced contactors in contact with said strip, a conducting backing plate on the opposite side of said strip adjacent said contactors, a voltage source connected in series with a high resistance and a condenser, a normally open polarized relay and a normally closed retarded relay, both of said relays being adjusted to operate at substantially the same current, a selector system connecting in turn each of said contactors in series with said backing plate, said condenser, and the contacts of both said relays, circuit means operating in synchronism with the operation of said selector system for producing a balancing voltage of amplitude varying periodically in a regular fashion from a maximum to a minimum value, said period of variation being less than the time during which there is a substantial change in amplitude of said electric voltages, an adjustable source of voltage, circuit means for applying said electric signal voltages, said adjustable voltage, and said balancing voltage to the coils of said relays in series, whereby the contacts of said polarized relay close whenever the amplitude of said electric signal voltages bears a predetermined relationship to the amplitude of said balancing voltage, the closing of said contacts causing said condenser to discharge rapidly through said selected contactors, said paper and said backing plate, producing a visible mark on said voltage-sensitive paper at each such discharge, said discharge occurring prior to opening of the contacts of said retarded relay.

DANIEL SILVERMAN.

REFERENCES CITED

The following references are of record in the file of this patent:

UNITED STATES PATENTS

| Number | Name | Date |
|---|---|---|
| 620,326 | Jaeger | Feb. 28, 1899 |
| 907,235 | Herrick | Dec. 22, 1908 |
| 2,229,324 | Gordon | Jan. 21, 1941 |
| 2,303,472 | Johnston | Dec. 1, 1942 |
| 2,321,605 | Keinath | June 15, 1943 |
| 2,348,711 | Chappell | May 16, 1944 |
| 2,400,828 | Keinath | May 21, 1946 |

FOREIGN PATENTS

| Number | Country | Date |
|---|---|---|
| 432,922 | Great Britain | Aug. 6, 1935 |
| 764,846 | France | Mar. 12, 1934 |

OTHER REFERENCES

Serial No. 416,911, Jacobi (A. P. C.), published May 25, 1943.